(12) United States Patent
Duffy

(10) Patent No.: US 7,776,769 B2
(45) Date of Patent: Aug. 17, 2010

(54) MANUFACTURE AND ASSEMBLY OF STRUCTURES

(75) Inventor: Roger P Duffy, Blackburn (GB)

(73) Assignee: BAE Systems plc, London (GB)

( * ) Notice: Subject to any disclaimer, the term of this patent is extended or adjusted under 35 U.S.C. 154(b) by 752 days.

(21) Appl. No.: 10/494,953

(22) PCT Filed: Oct. 22, 2002

(86) PCT No.: PCT/GB02/04778

§ 371 (c)(1),
(2), (4) Date: May 7, 2004

(87) PCT Pub. No.: WO03/039851

PCT Pub. Date: May 15, 2003

(65) Prior Publication Data

US 2005/0020158 A1 Jan. 27, 2005

(30) Foreign Application Priority Data

Nov. 9, 2001 (GB) .................................. 0126957.0

(51) Int. Cl.
*B32B 27/12* (2006.01)
(52) U.S. Cl. ..................................................... 442/286
(58) Field of Classification Search .................. 442/66, 442/85, 286
See application file for complete search history.

(56) References Cited

U.S. PATENT DOCUMENTS

| | | |
|---|---|---|
| 3,936,547 A | 2/1976 | Schnee et al. |
| 4,556,592 A | 12/1985 | Bannink |
| 4,701,488 A | 10/1987 | Williams |
| 4,897,301 A | 1/1990 | Uno et al. |
| 4,913,955 A * | 4/1990 | Noda et al. ................. 442/234 |
| 5,484,221 A | 1/1996 | DeCoux |

FOREIGN PATENT DOCUMENTS

| | | |
|---|---|---|
| EP | 0 716 196 | 6/1996 |
| EP | 0 294 232 A | 12/1998 |
| EP | 0 913 875 | 5/1999 |
| EP | 0 982 311 | 3/2000 |
| GB | 893 676 A | 4/1962 |
| WO | WO 82/00269 | 2/1982 |
| WO | WO 93/21001 | 10/1993 |
| WO | 01/14208 A | 3/2001 |

OTHER PUBLICATIONS

WPI Abstract, JP 11071823, Mar. 1999.
WPI Abstract, JP 63039978, Feb. 1988.
WPI Abstract, JP 48024951, 1973.
WPI Abstract, JP 3286856, Dec. 1991.
WPI Abstract, JP 53016739, Feb. 1978.
WPI Abstract, FR 2 251 151, Jun. 1975.
Database WPI, Section Ch, Week 198814, Derwent Publication Ltd., London, GB; Class A32, AN 1988-095252, XP002192749 & JP 63-047108 A, Feb. 27, 1988.

* cited by examiner

*Primary Examiner*—Arti Singh-Pandey
(74) *Attorney, Agent, or Firm*—Nixon & Vanderhye P.C.

(57) ABSTRACT

The invention relates to a method of assembling structures and a component for use in such assemblies. The component is an electrically insulant, compressible impermeable cloth. It is formed by impregnating an electrically insulant woven fiber with a sealant, and curing to form the cloth. Structures, such as airframe structures, may be assembled by positioning the cloth between a substructure and an outer skin on at least part of a sub-structure, and then assembling the outer skin to the sub-structure with the cloth located between the substructure and the outer skin. This provides a greater impermeability and insulation across the structural joint. During assemble the cloth may also be compressed, allowing skin panels to be fixed to the substructure within close tolerances, and allowing steps between adjacent panels to be substantially reduced.

6 Claims, 1 Drawing Sheet

MANUFACTURE AND ASSEMBLY OF STRUCTURES

This application is the US national phase of international application PCT/GB02/04778 filed in English on 22 Oct. 2002, which designated the US. PCT/GB02/04778 claims priority to GB Application No. 0126957.0 filed 9 Nov. 2001. The entire contents of these applications are incorporated herein by reference.

BACKGROUND OF THE INVENTION

1. Field of the Invention

The present invention relates to the manufacture and assembly of structures, particularly those structures having an outer layer or skin secured to or supported by a sub-structure and where the outer layer is required to conform within close tolerances to a predetermined profile.

2. Discussion of Prior Art

It is often desirable to assemble such structures by first providing the sub-structure, or skeletal framework, and then attaching panels to the sub-structure to form the outer layer or skin.

This type of structure is common in the design and manufacture of aircraft where light-weight, high strength structures are required. In this industry it is additionally necessary to ensure that all the parts of the structure are manufactured within tight tolerances and furthermore that the parts fit together so that the assembled structure meets stringent accuracy requirements.

Any out of tolerance parts or inaccurately fitted parts will cause the adjacent parts being assembled to be fitted out of their required place in the structure, rendering the structure unacceptable. It is also important that adjacent parts of the outer skin do not have a step between them so that the constituent panels and skins of the outer layer of the aircraft structure are flush with one another. Failing to provide a substantially smooth aircraft outer layer can result in unwanted aerodynamic effects such as increased drag or turbulence.

To meet the strict tolerances required in aircraft construction for example the underlying sub-structure may be made from machinable aluminium or titanium. The sub-structure may then be machined as necessary to allow outer skins or panels to be fitted to it without adjacent skins or panels having a step between them. This method is not desirable as any machining errors may cause the whole sub-structure to fail a quality assurance inspection and be rejected with consequent cost and time penalties. Additionally underlying sub-structures are increasingly being made from lightweight composite materials such as carbon fibre reinforced plastics (CFRP) and these materials are not readily machinable.

A method of producing structures to high accuracy requirements is known, and can be used with sub-structures made of either metal or CFRP. In this method, the surfaces of sub-structure to which panels are to be attached are coated with a filled, two component liquid adhesive material, with aluminium added to it. The liquid adhesive is cured on the sub-structure, and is then machined to a desired thickness before the panels or skins are fixed to the sub-structure. The cured adhesive may be machined to different thicknesses at different locations on the sub-structure so that, when the panels or skins are fixed to it there is substantially no step between adjacent panels or skins.

Whilst this method produces structures having profiles with acceptable accuracy, it has several disadvantages. Adhesive of this type is a viscous liquid which must be applied carefully to the sub-structure by hand using a spatula, so that it is distributed reasonably evenly with the desired thickness and without creating air bubbles in the adhesive. Too much adhesive will result in a longer wait for curing and more time spent in machining than necessary. Adhesive of this type is difficult to apply in desired quantities because of its viscosity and furthermore, there are health and safety implications associated with its use. Personnel must be trained to use such adhesive and must be careful when applying it to the sub-structure. Also special tooling must be manufactured, tailor made for each area to be panelled, to prevent the liquid adhesive from spreading to areas where it is not required, and to give guidance as to the thickness of the adhesive being applied. Because of the nature of this type of adhesive, the tooling must be coated with a release agent before use and cleaned thoroughly after use. Repeated exposure to this coating and cleaning process causes the tooling to deteriorate rapidly after a relatively low number of uses, resulting in time lost and expense in manufacturing and fitting replacement tooling.

Furthermore, it is usually desirable to ensure that a joint between a substructure and an outer skin is both insulated and sealed, to prevent electrical current and liquids respectively from flowing through the joint. In the event of a lightning strike, current flowing from the outer skin through the joint to the substructure can damage the integrity of the joint, and thereby compromise the safety of the aircraft. Liquid flowing through the joint can cause corrosion, which may weaken the joint and/or the adjacent substructure and/or the outer skin.

Known methods of producing structures involve bonding a resin-impregnated glass fibre cloth to the inner surface of the outer skin, to provide an insulative layer between the outer skin and the substructure. The substructure, or a layer formed thereon as described above, is then machined to the required tolerance, and finally sealant is applied between the substructure and the glass fibre cloth before the substructure and the outer skin are bonded or bolted together.

This method has several drawbacks. Firstly, the glass fibre cloth, having different material characteristics to the outer skin, can expand at a different rate to the outer skin, which may be carbon fibre for example. Such differential expansion may cause delamination or distortion of the outer skin, both of which have serious consequences for aircraft. Secondly, the sealant, which is generally obtainable as a viscous liquid, is often squashed out of the joint during assembly to an extent that the joint is rendered permeable. Thirdly, the machining of the substructure or the layer formed thereon to obtain the required tolerances is time consuming and has the difficulties and disadvantages described in detail above.

SUMMARY OF THE INVENTION

The present invention seeks to provide a method of and components for assembling structures having an outer layer supported by a sub-structure, and where the outer layer is required to conform, within close tolerances, to a predetermined profile, with improved insulation and impermeability across the joint, and without the need to machine the sub-structure or a layer formed thereon to close tolerances.

According to the present invention in one aspect thereof, there is provided a method of assembling a structure comprising at least the steps of providing a sub-structure, providing an electrically insulant cloth which is impregnated with a sealant that substantially prevents the passage of liquid through the cloth, the impregnated electrically insulant cloth being compressible, assembling an outer layer with the sub-structure such that the electrically insulant cloth lies substantially between the outer layer and the sub-structure, exerting pressure on the structure during assembly to cause the impregnated electrically insulant cloth to compress to a desired thickness, such that an outer surface of the structure is within a required tolerance.

Preferably the electrically insulant cloth undergoes curing during assembly of the structure. If required, the substructure, or a layer disposed thereon, may be machined prior to assembly of the structure.

According to the invention in another aspect thereof, there is provided an electrically insulant cloth impregnated with a sealant that substantially prevents the passage of liquid through the cloth, the impregnated electrically insulant cloth being compressible. Preferably the cloth is a glass fibre cloth. Advantageously the cloth is compressible.

The cloth may comprise at least one layer of cloth impregnated with a sealant and further comprise a layer comprising partially cured sealant. In this case, the layer comprising partially cured sealant may or may not have substantially constant thickness. It may be advantageous to vary the thickness, particularly where the substructure is stepped, so that the outer panel may still be fixed within the tolerance required. The cloth may further comprise a layer comprising precured sealant. Preferably the cloth has at least one surface having adhesive properties, enabling it to be affixed to the substructure without slipping during assembly of the structure.

According to the invention in another aspect thereof, there is provided a method of making an electrically insulant and impermeable cloth comprising at least the steps of substantially impregnating an electrically insulant cloth with a sealant that substantially prevents the passage of liquid through the cloth, curing the impregnated electrically insulant cloth, then adding a layer of sealant to the cured impregnated electrically insulant cloth, and partially curing said layer of sealant. This provides a readily compressible layer having adhesive properties, enabling the cloth to be easily affixed to the substructure.

The method may alternatively comprise the further steps of adding a first layer of sealant to a first side of the cured impregnated electrically insulant cloth, and fully curing the first layer of sealant, then adding a second layer of sealant to a second side of said cloth and partially curing the second layer of sealant. This provides a cured impermeable layer on one side of the cloth and a readily compressible, adhesive layer on the other side of the cloth.

According to the invention in another aspect thereof, there is provided a structural joint comprising a substructure and an outer layer, having an intermediate layer disposed between the substructure and the outer layer, wherein the intermediate layer is substantially impermeable and substantially compressible and substantially electrically insulant, the intermediate layer comprising an electrically insulant cloth which is impregnated with a sealant that substantially prevents the passage of liquid through the cloth.

BRIEF DESCRIPTION OF THE DRAWINGS

Embodiments of the invention will now be described, by way of example only, and with reference to the following drawings and examples.

DETAILED DISCUSSION OF EMBODIMENTS

Figure 1:
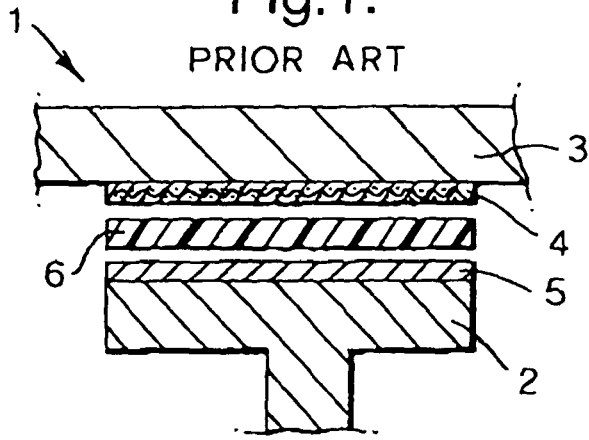
FIG. 1 shows an exploded section through a prior art assembly of a sub-structure and outer skin.

Referring now to the drawings in which the same features are denoted by common reference numerals:

FIG. 1 shows a prior art structure 1 of part of an aircraft comprising a sub-structure 2 and an outer skin 3 which is one of several outer skin panels to be fitted to the sub-structure 2. The outer skin and the substructure may be formed from metal or carbon fibre composite, as desired. The outer skin panels including outer skin 3, and the sub-structure 2 are manufactured and assembled with adherence to strict tolerance limits. However, due to the cumulative dimensional tolerances of the sub-structure and the outer skin panels resulting from their individual manufacture, there will be a step between adjacent outer skin panels, which results in unwanted aerodynamic effects which can affect the performance of the aircraft. For aircraft applications it is typically preferable to have a step of less than 0.5 mm between adjacent panels.

A resin-impregnated glass fibre cloth 4 has been bonded to the underside of the outer skin 3, to provide an electrically insulant layer. A shim layer 5 has been applied to the substructure 2, and has been cured and machined to tolerance as described earlier in this specification (see pages 1 and 2), to attempt to lessen the step between adjacent outer skin panels. A layer 6 of a sealant such as PRC (Polysulphide Rubber Compound) has been applied to the shim layer 5 of the substructure and/or the glass fibre cloth bonded to the outer skin to prevent the ingress of water or the egress of liquids such as aircraft fuel or oil. The sealant is of a viscous liquid form for easy application, but has a tendency to be squeezed out of the joint during assembly.

Figure 2:
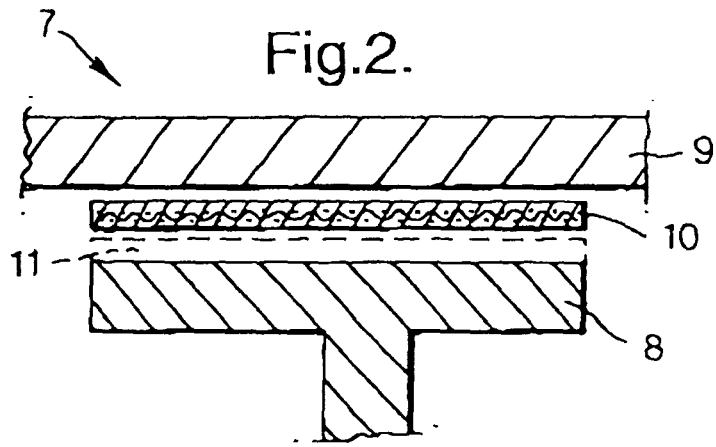
FIG. 2 shows an exploded section through an assembly of a sub-structure and outer skin utilising an embodiment of the present invention.

FIG. 2 shows a structure 7 of part of an aircraft in accordance with the present invention, comprising a substructure 8 and an outer skin 9 which is one of several outer skin panels to be fitted to the sub-structure 8. The outer skin and the sub-structure may be formed from metal or carbon fibre composite, as desired. The outer skin panels including outer skin 9, and the sub-structure 8 are manufactured and assembled with adherence to strict tolerance limits. If desired, a shim layer 11 (shown as a dotted line) may be applied to the substructure and cured and machined prior to assembly. However, in most cases, it will not be necessary if the present invention is employed.

Prior to assembly of the structure, an electrically insulant woven fibre which was impregnated with a sealant such as PRC that substantially prevents the passage of liquid through the resultant cloth 10 is disposed on either the substructure or the underside of the outer skin, so that on assembly the cloth 10 will be located between the substructure and the outer skin, thereby forming part of the joint. The cloth in this example is glass fibre cloth which has good insulant properties. The cloth was made by impregnating woven glass fibre with a sealant, instead of with the conventional resin. Resin allows water and other liquids to seep through the material, is so is not suitable for use as a sealant. Impregnating the woven glass fibre with a sealant such as PRC instead of resin allows the resultant cloth to have both impermeability and insulant characteristics.

Figure 3:
FIGS. 3, 4 and 5 show sections through first, second and third examples respectively of a cloth in accordance with an embodiment of the present invention.

FIG. 3 shows an electrically insulant, impermeable glass fibre cloth 12, suitable for use in the manufacture of assemblies in accordance with the present invention. The cloth 12 may comprise one or more layers of woven glass fibre impregnated with sealant.

Figure 4:
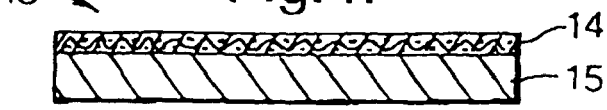

FIG. 4 shows an electrically insulant, impermeable glass fibre cloth 13 which comprises a layer 14 of woven glass fibre impregnated with sealant, and further comprises a layer 15 of partially cured sealant. The layer 14 is formed first, by impregnating the woven glass fibre with sealant and then curing it. The layer 15 is then formed by adding sealant to one face of the resultant layer 14 and the cloth is then partially cured. The partially cured layer 15 may be of the same or different thickness to the layer 14 and is readily compressible. The thickness of layers 14 and 15 may vary along their lengths and widths, dependent upon the requirements of the assembled structure. The thickness of layer 14 may be approximately 0.25 mm and the thickness of the partially cured layer 15 may be approximately 1.5 mm for example.

Figure 5:
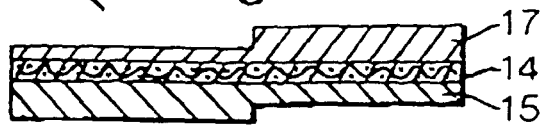

FIG. 5 shows an electrically insulant, impermeable glass fibre cloth 16 similar to that of FIG. 4. The cloth 16 comprises a layer 14 of woven glass fibre impregnated with sealant, and also comprises a layer 15 of partially cured sealant. The cloth 16 further comprises a pre-cured layer of sealant 17. The layer 17 is impermeable, and enhances the impermeability of the cloth, which is desirable for use in areas where the ingress of water would be very serious. The relative thicknesses of the layers 14, 15 and 17 differ, and the thicknesses of each of the layers may differ along their length.

The cloth is made by first forming the layer 14, by impregnating the woven glass fibre with sealant and then curing it. The layer 17 is then formed by adding sealant to one face of the layer 14, and fully curing the resultant cloth. The layer 15 is formed lastly, by adding sealant to the other face of the layer 14 and partially curing the cloth to arrive at the finished cloth 16.

It can be seen that adjacent outer skin panels in an assembly may need to be adjusted to fit flush together without a step between them when they are assembled to a substructure. The prior art uses machinable substructures or shims to achieve this. The present invention allows adjustment of the outer skin panels simply by utilising different pressures on each of the outer skin panels during assembly, so that each compresses the partially cured sealant by a different amount, allowing the outer skin panels to be assembled within very tight tolerances.

The partially cured sealant layer will have adhesive properties, and so the cloth may be easily stuck to the substructure without falling off during assembly, prior to curing of the structure. Advantageously the cloth may be pre-cut into gaskets designed to fit a particular part of an assembly, and the gaskets may be affixed to the substructure prior to assembly and curing of the structure.

The invention claimed is:

1. A layer of electrically insulant woven cloth impregnated with a non-epoxy curable sealant that substantially prevents the passage of at least one of water, aircraft fuel and oil through the cloth, the impregnated electrically insulant cloth being substantially compressible, between two outer faces of the layer, wherein said cloth comprises at least one layer of woven cloth impregnated with said sealant and further comprises a layer comprising a partially cured sealant.

2. An electrically insulant woven cloth as claimed in claim 1 wherein said layer comprising partially cured sealant does not have substantially constant thickness.

3. An electrically insulant woven cloth as claimed in claim 1 wherein said at least one layer of woven cloth is impregnated with a precured sealant.

4. An electrically insulant woven cloth as claimed in claim 1 wherein said partially cured sealant has adhesive properties, and said layer of partially cured sealant forms an outer layer of the cloth.

5. A method of making a layer of compressible, electrically insulant and impermeable woven cloth comprising at least the steps of:
   substantially impregnating a layer of electrically insulant woven cloth with a non-epoxy sealant that substantially prevents the passage of at least one of water, aircraft fuel and oil through the cloth,
   curing the impregnated electrically insulant cloth,
   adding a layer of sealant to the cured impregnated electrically insulant cloth, and partially curing said layer of sealant,
   the cloth being substantially compressible, between two outer faces of the layer, to a desired thickness.

6. A method of making an electrically insulant and impermeable woven cloth as claimed in claim 5 comprising the further steps of adding a first layer of sealant to a first side of the cured impregnated electrically insulant woven cloth, and fully curing the first layer of sealant, then adding a second layer of sealant to a second side of said cloth and partially curing the second layer of sealant.

* * * * *